United States Patent Office 3,411,833
Patented Nov. 19, 1968

3,411,833
SYSTEM FOR THE AUTOMATIC BRAKING OF VEHICLES, PARTICULARLY TO PERFORM NORMAL, EMERGENCY STATIONARY BRAKING
Giuseppe Alfieri, Viale Maino 21, Milan, Italy
Filed Apr. 7, 1966, Ser. No. 567,324
Claims priority, application Italy, Apr. 7, 1965, 7,658/65; Nov. 26, 1965, 26,355/65
14 Claims. (Cl. 303—7)

ABSTRACT OF THE DISCLOSURE

A system for the pneumatic braking of vehicles such as tractor-trailer combinations in which a pneumatic servomotor and a mechanical servomotor are provided to actuate the braking members. The pneumatic servomotor is connected to a pressure source to perform normal braking while the mechanical servomotor is normally pressurized but is vented to the atmosphere to provide emergency braking. The system includes a pneumatic distributor and valve means to control the flow of pressurized air to the servomotors.

---

The present invention concerns a system for the pneumatic braking of vehicles, in particular to perform the normal, emergency and stationary braking of vehicles in general, either the tractor alone or of a tractor with one or more trailers.

The present invention is applied particularly to the pneumatic braking systems, constituted on the tractor of an air compressor, of compressed air reserve tanks and of a pedal actuated distributor controlling the feeding of the pneumatic operating members whereby the brakes are actuated. In general, in said known systems, the tractor braking is performed through double operating members, constituted namely of two elementary motors, one mechanical and the other pneumatic, suitably arranged, for operating the brakes during normal braking or during emergency braking. With said operating members in the known systems, if the normal braking is carried out when emergency braking is occurring, or vice versa, some drawbacks may occur, the most serious of which is due to the simultaneous intervention on the brakes of both elementary motors, whose action is substantially doubled.

An object of the invention is to obviate said drawbacks through the automatic exclusion of the operating members for the normal braking, whenever emergency braking is operated. Another object is to provide an emergency braking which may be graduated, as well as to obtain vehicle braking in the stationary state while utilizing the same means employed for obtaining the emergency braking. Said brakings may be extended also to the occasional trailer.

The system according to the present invention comprises a pressure generator, one or more tanks for the compressed air constituting pressure sources, a pedal operated distributor for controlling the feeding of the operating members actuating the brakes, wherein at least in one of the tractor sections said operating members are of the mechanical type, namely are constituted of two elementary motors whereof one, the pneumatic motor, is provided with a chamber fed by one of the pressure sources through said distributor for carrying out the normal braking whereas the mechanical motor is provided with a chamber normally kept under pressure by one of said pressure sources and is connected with the atmosphere to perform the emergency braking. Said system is characterized by two valve devices, one for controlling the normal braking and the other for operating the emergency and stationary braking. The said valve devices include interception valves which are actuated simultaneously in their opening or closure positions, so that when said valves are in the opening position in order to arrange in advance the system for normal braking, the first of said valve devices puts in communication the distributor with the pneumatic motor chamber and the second valve device puts in communication one emergency pressure source with the pneumatic chamber of the mechanical motor whereas when said valves are in the closure position for carrying out the emergency and stationary braking the first valve device intercepts the communication originating from the distributor and puts in communication with the atmosphere the pneumatic motor chamber and the second valve device intercepts the communication originating from the emergency pressure source and connects with the atmosphere the pressure chamber of said mechanical motor.

The above defined concept may be in practice achieved in different ways intended to attain the desired objects. For instance the second valve device, employed for emergency and stationary braking, is provided with manually operated control members; said manual control members may operate also the first valve device. Accordingly under this point of view both valve devices may be grouped so as to form a unity where the movable portions of said devices are operated by a single control member.

In a profitable alternative embodiment of the system, the first of both valve devices, constituting two distinct and separated unities, is provided with pneumatic servo controls, whose feeding is made by the second valve device, which performs emergency and stationary braking and which may be manually operated. In the case of vehicles having a trailer provided with pneumatic brakes and with servoautodistributor and wherein at least one of the braking sections of said trailer the operating members are of the bipneumatic type, namely are constituted of two pneumatic motors, one for normal braking through the servoautodistributor and the other for emergency braking, the system according to the invention is integrated by a third valve device for emergency braking, mounted on the trailer, pneumatically connected with the second valve device, comprising means sensitive to the pressure of the emergency pressure source of the tractor, through the second valve manually operated and controlling the sensitive means of the first valve device, said sensitive means of the third valve device actuating the interception members inserted in the trailer emergency braking line, so that when the tractor emergency braking is performed through the manual control joined with the second valve device, the pneumatic chambers of the operating members for the trailer emergency braking are fed by a second trailer emergency source.

The invention will now be explained by the following description with reference to the enclosed drawings, which are given for illustrative purposes only and which show three pneumatic braking systems according to the invention and precisely:

FIGURE 1 is a scheme of the pneumatic braking system for a tractor where the valve device for the normal braking is pneumatically servo-controlled by the device for the emergency and stationary braking.

FIGURES 2 and 3 supplement each other and illustrate the scheme of a pneumatic system for braking a tractor (FIG. 2) with trailer (FIG. 3).

FIGURE 5 is a cross section of the group of both valve devices of FIG. 4, whereas

In each one of the illustrated pneumatic systems a compressed air generator A charges through a depurator B, some pressure sources formed by the tanks $C_1$, $C_2$, $C_3$, provided with check valves. A distributor D, operated through the pedal $D_1$, controls the feeding of the pneumatic operating members whereby the brakes are actuated. Precisely the brakes of the front wheels of the tractor are operated by simple pneumatic operators F fed by the tank $C_1$ through the distributor D. On the contrary, the brakes for the rear wheels of the tractor are operated by operating members G, fed by the tank $C_3$.

Figure 1:
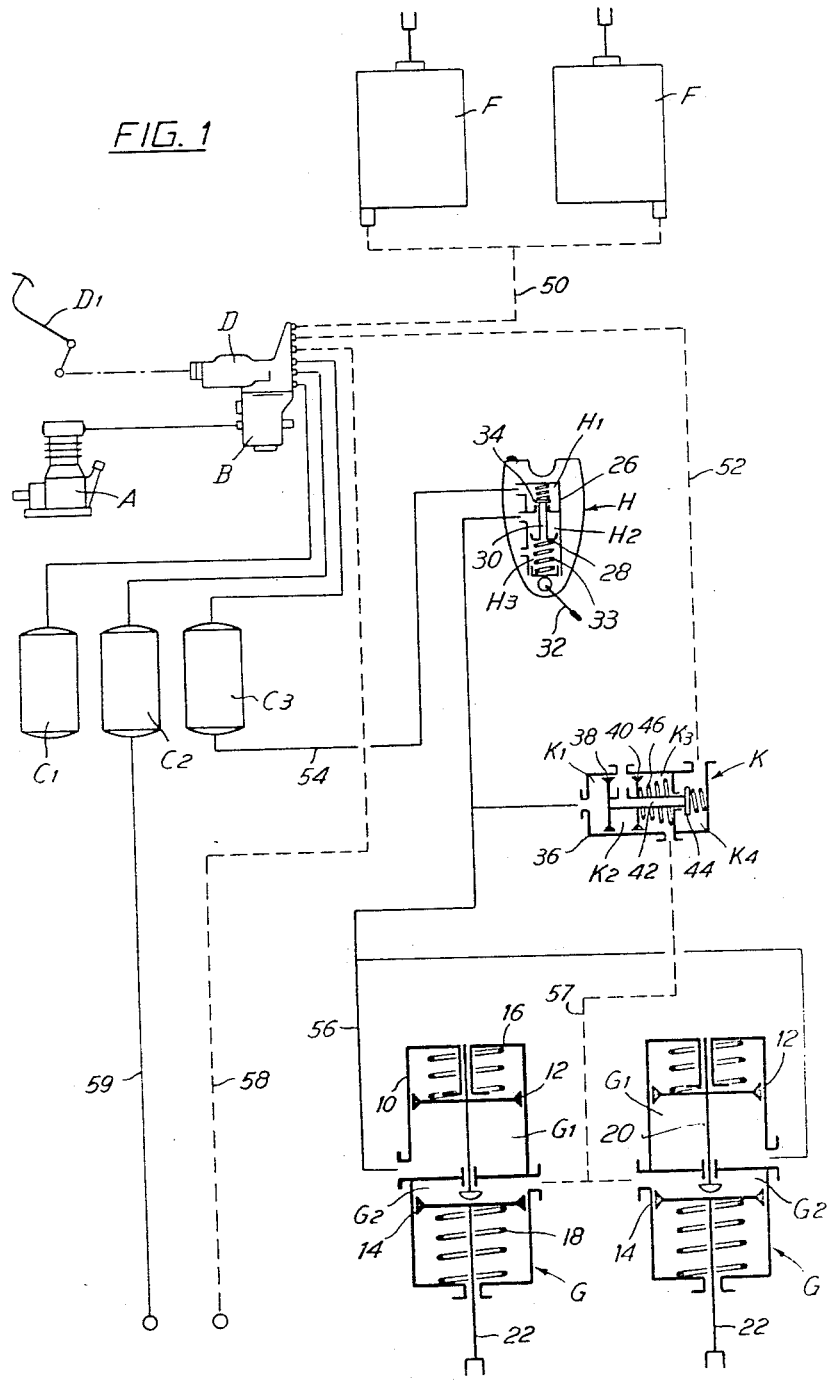

With reference to the scheme of FIGURE 1, each one of the operating members G for the rear wheels of the tractor is of the mechanical-pneumatic type, namely said member is constituted of two elementary motors, the one pneumatic for the normal braking and the other mechanical for the emergency and stationary braking.

Each one of these operating members G is formed of a cylindrical housing 10 wherein two pistons 12 and 14 slide, the one following closely the other and biased by respective springs 16 and 18, so that the stem 20 of the first, pertinent to the mechanical or assistance motor, acts on the brakes through the stem 22 of the second; this latter piston is mechanically independent from the first and its stem 22 is connected with the operating members of the brakes. Pistons 12 and 14 delimit in the cylinder 10 two respective pneumatic opposed chambers: $G_1$ (relative to the mechanical motor for the emergency braking) and $G_2$ (relative to the pneumatic motor for the normal braking), the first being fed by the tank $C_3$ (constituting the tank for the graduated and emergency braking of the rear tractor wheels), whereas the second is fed by the tank $C_1$ through the distributor D.

The tank $C_3$ is connected with a valve device H manually actuatable, constituted in the known way of a body 26 for a piston 28 provided with a bored push rod 30 and operated by a handle 32 through a spring 33. A spring interception valve 34 is operated by said push rod to form thus a commutable interception member. In the body 26 the just considered parts delimit a tern of chambers $H_1$, $H_2$ and $H_3$, the first being connected with the tank $C_3$, the second with the chambers $G_1$ of the mechanical motors and the third with the atmosphere.

Chamber $H_2$ of the valve device H is connected also with another valve device K constituting a servo-deviator and which in relation to the foregoing constitutes the first of the valve devices, whereas the second is the valve device H already considered. The first device K involves a cylinder 36 wherein two pistons 38 and 40 slide both unitary with a bored push rod 42 and delimiting a tern of chambers $K_1$, $K_2$ and $K_3$, the first of which is connected with the chambers $G_1$ of the mechanical motors G and with the chamber $H_2$ of the second device H, the second with the atmosphere and the third with the chambers $G_2$ of the pneumatic motors G.

The push rod 42 co-operates with a spring valve 44 controlling communication between the chamber $K_3$ and another chamber $K_4$ occurring beyond the bottom of the cylinder 36 and connected, through the distributor D, with the tank $C_3$. A spring 46 of suitable and calibrated characteristics acts on the pair of pistons 38–40 to contrast the pressure which may occur each time in the chamber $K_1$.

The illustrated system may be connected through lines 58 and 59 with a known pneumatic braking system of a trailer drawn by the tractor and which is fed by the tank $C_2$.

The just considered pneumatic braking system during regular running operates in the following way: the air under pressure from tank $C_3$ passes through the chambers $H_1$ and $H_2$ of the second device H to the chamber $K_1$ of the servo-deviator K and to the chambers $G_1$ of the mechanical motors G. Accordingly the pistons 12 of said motors G are displaced in contrast to the action of springs 16 and these latter are held under pressure by the pressure occurring in the chambers $G_1$.

Correspondingly the air under pressure of said tank $C_3$ passes into the chamber $K_1$ of the first valve device K, displaces the pair of pistons 38–40 in contrast with the action of spring 46, and the push rod 42 engages the valve 44, removing it from its seat to connect the chambers $K_3$ and $K_4$.

Accordingly owing to these latter connections, when the distributor D is operated, the air of tanks $C_1$ and $C_3$ is conveyed to the motors F, through the line 50, to the chambers $G_1$ of the pneumatic motors G through the line 56, and to the chambers $G_2$ of the mechanical motors G through the chambers $K_3$, $K_4$ of the first device K and lines 52 and 57, so that the pistons 14 will be displaced in contrast to the action of the springs 18. The emergency braking with the just considered system is performed either automatically or manually, when the system pressure or the one downwards of the tank $C_3$ reduces beyond a given limit; in this case since a pressure reduction occurs in the chamber $K_1$ of the first servodeviator device K, the action of the spring 46 prevails on the one exerted by said pressure and shifts the pair of pistons 38–40 to remove the bored push rod 42 from the valve 44. This latter intercepts the communication between the chambers $K_3$ and $K_4$. Chamber $K_3$ is connected with the atmosphere through the bored push rod 42 and the chamber $K_2$ and thus also the chambers $G_2$ of the pneumatic motors G are connected with the atmosphere thus avoiding overpressure which could arise in the chambers. As a result of the pressure drop occurring in the system also the pressure in the chambers $G_1$ of the mechanical motors G is reduced and the pistons 12, which are no longer hindered by the pressure, are shifted by the action of the respective springs 16 toward the pistons 14, whereby the braking members are thus operated.

Of course, when the regular running pressure is restored in the considered pneumatic system, the brakes are automatically set free and the efficiency of said system is restored.

In the case that the emergency braking is accomplished manually through the second valve device H, the maneuver of this latter establishes the same pneumatic circuits. The bored push rod 30 of said device is disengaged from the spring valve 34 and this latter, under the action of the respective spring, engages its holding seat to intercept thus the communication between the chambers $H_1$ and $H_2$ and connect this latter chamber with the atmosphere. Consequently, since the chamber $K_3$ and the chambers $G_1$ of the mechanical motors are connected with the atmosphere, the same previously considered functional conditions occur. On the other hand when the push rod 30 of the second valve device is brought back in the initial position the pneumatic circuits for the normal braking are actuated. Of course when the valve device H is suitably maneuvered it is possible to regulate or modulate the aid braking as in the case of the normal braking made with the pedal $D_1$.

Figure 2:
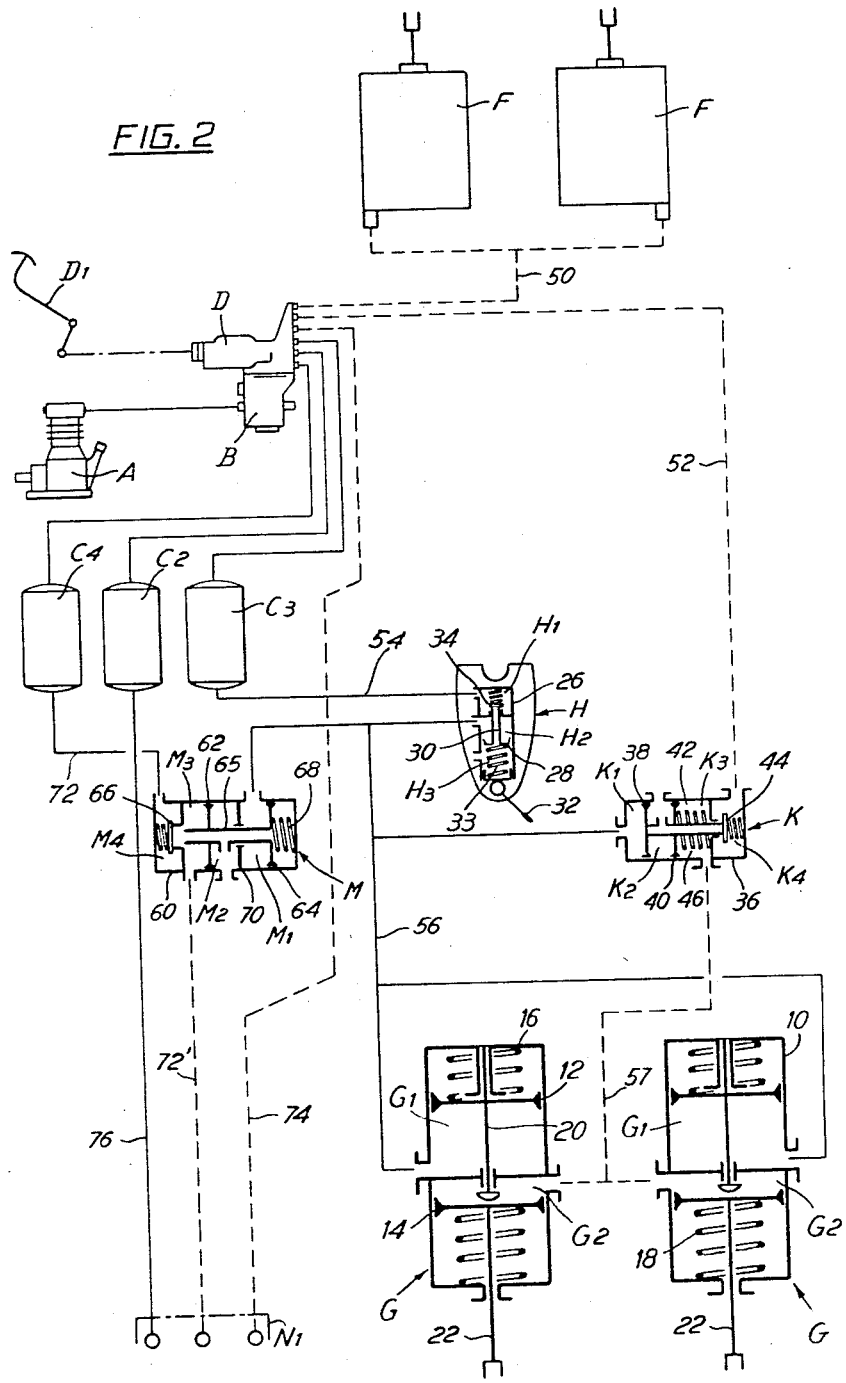
Figure 3:
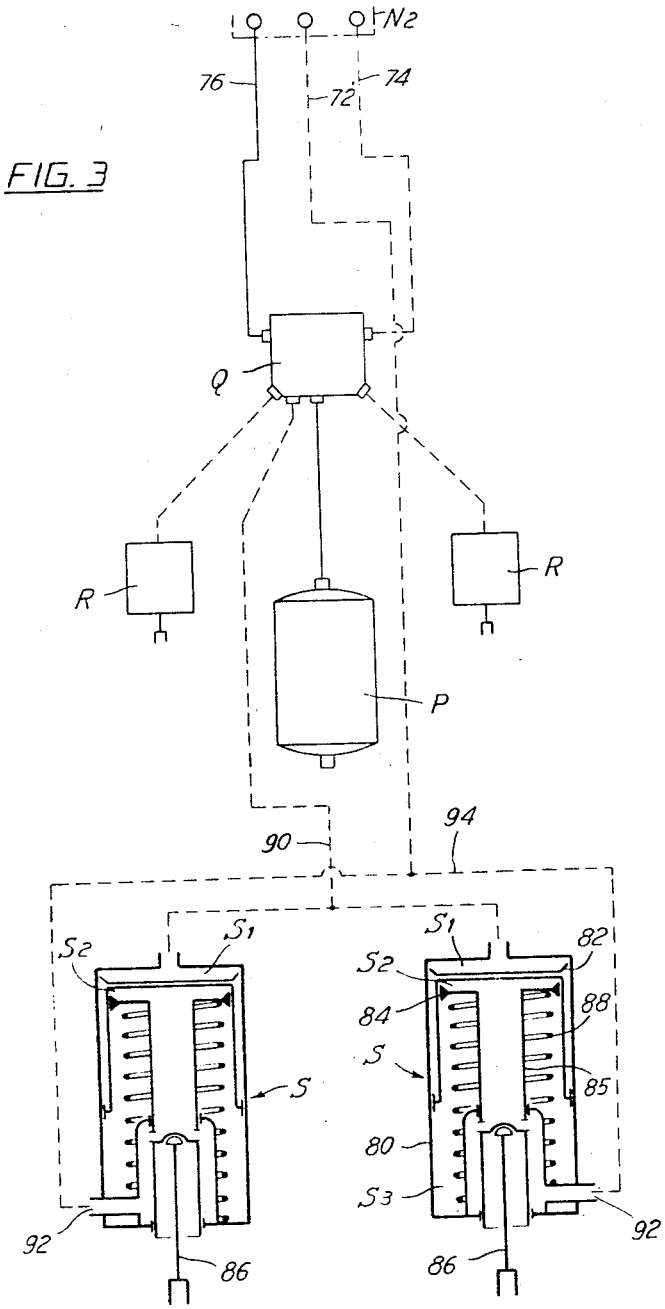

The pneumatic braking system according to the invention, for a vehicle constituted of a tractor and one or more trailers, is illustrated by FIGURES 2 and 3; the system relating to said tractor (FIG. 2) is equal, except for what will be now said, to the system illustrated by FIGURE 1 and accordingly the like parts of both these figures are distinguished by like reference marks which accordingly will not be described. The system of FIG. 2 involves moreover, an auxiliary or aid tank $C_4$ for the compressed air utilized for the emergency braking of the trailer and a third valve device M, constituting a pneumatic servo control. This third device is made up of a cylinder 60 for two pistons 62 and 64 unitary with a bored push rod 65, co-operating with a spring interception valve 66. A spring 68 acts on the pair of pistons 62–64 to engage the push rod 65 against the valve 66, so as to remove it from its holding seat.

Between both pistons 62 and 64, diaphragm 70 and cylinder 60 are formed chambers $M_1$, $M_2$, $M_3$ and $M_4$; the first is connected with tank $C_3$ through the interception valve 34 of the second valve device H; the second is permanently connected with the atmosphere, whereas the third chamber $M_3$ is connected with a line 72 which will be discussed hereinafter; finally the chamber $M_4$ is connected with the auxiliary tank $C_4$ for the emergency braking for the trailer.

The system of FIGURE 2 is completed by a line 74 constituting the conventional line for the graduated braking of the trailer which, starting from the distributor D, ends at a group of connections $N_1$–$N_2$ whose elements occur in the tractor and the trailer, to establish thus the pneumatic connections between both systems.

Another line 76 connects the tank $C_2$ with the trailer braking system, which involves in a known way (see FIG. 3) a tank P for the compressed air, a servoautodistributor Q and normal operating members R for actuating the brakes of the front wheels of the trailer and S for actuating the brakes of the rear wheels. Each one of the latter is constituted of two bipneumatic motors where a cylinder 80 holds a hollow piston 82 which forms a second cylinder whereinto a second piston 84 slides. This latter is provided with a tubular stem 85 linked through a rod 86 to the operating members of the brakes. A spring 88 acts on the piston 84 to press this latter and the hollow piston against the bottom of the cylinder 80.

Both pistons 82 and 84 delimit in the cylinder 80 the chambers $S_1$ and $S_2$, the first being connected through a line 90 to the servoautodistributor Q and the second, through the bored stem 85, to the union 92, a line 94, to the lines 72 of FIGURE 3 and to the chamber $M_3$ of the third valve device M.

Servoautodristributor Q is connected in the known way to lines 74 for the moderable braking and 76 for the automatic braking of the trailer.

Operation of the pneumatic system of FIGURES 2 and 3 is substantially the same as the one of the system of FIG. 1, namely when said system is in the normal operation conditions and its members are in the rest position, in the chambers $G_1$, $K_1$ and $M_1$ the regular running pressure occurs.

Accordingly the already considered pneumatic circuits for the system of FIG. 1 are established; the third valve device M, through the chambers $M_4$ and $M_3$ and the lines 72, intercepts the communication between the emergency tank $C_4$ and the chambers $S_2$ of the bipneumatic motors S.

The graduated or normal braking of the vehicle is performed in the already considered conventional way in the case of the system of FIG. 1, whereas the modulated trailer braking is carried out by the servoautodistributor Q controlling the feeding of the operating members R and S.

Namely, when in said system a reduction of the regular running pressure occurs, the springs 16, 46 and 68 of the mechanical motors G and of the first and third servodeviator devices K and M, respectively, displace the pistons 12 of the mechanical motors G and the pairs of pistons 38–40 and 62–64, respectively, of said servodeviators K and M. The mechanical operating members G actuate the brakes of the vehicle rear wheels, whereas the first servodeviator device K, by closing the valve 44, discontinues the communication between the distributor D and the chambers $G_2$ of the pneumatic motors G; the servodeviator device M, by means of its push rod 65, removes the valve 66 from the respective seat to establish, through the lines 72, 72' and 94, the connection between the aid tank $C_4$ and the chambers $S_2$ of the bi- pneumatic motors S of the trailer. Accordingly the brakes of the rear wheels of the trailer are actuated together with the tractor's rear wheels, so that the vehicle will be braked.

In this case too the restoration of the normal regular running pressure sets free the brakes and puts again in efficiency the braking system.

In order to perform manual emergency braking, the second valve device H is operated by disengaging its bored push rod 30 from the valve 34 to establish the considered pneumatic circuits, to actuate the brakes for the tractor and trailer rear wheels.

Figure 4:
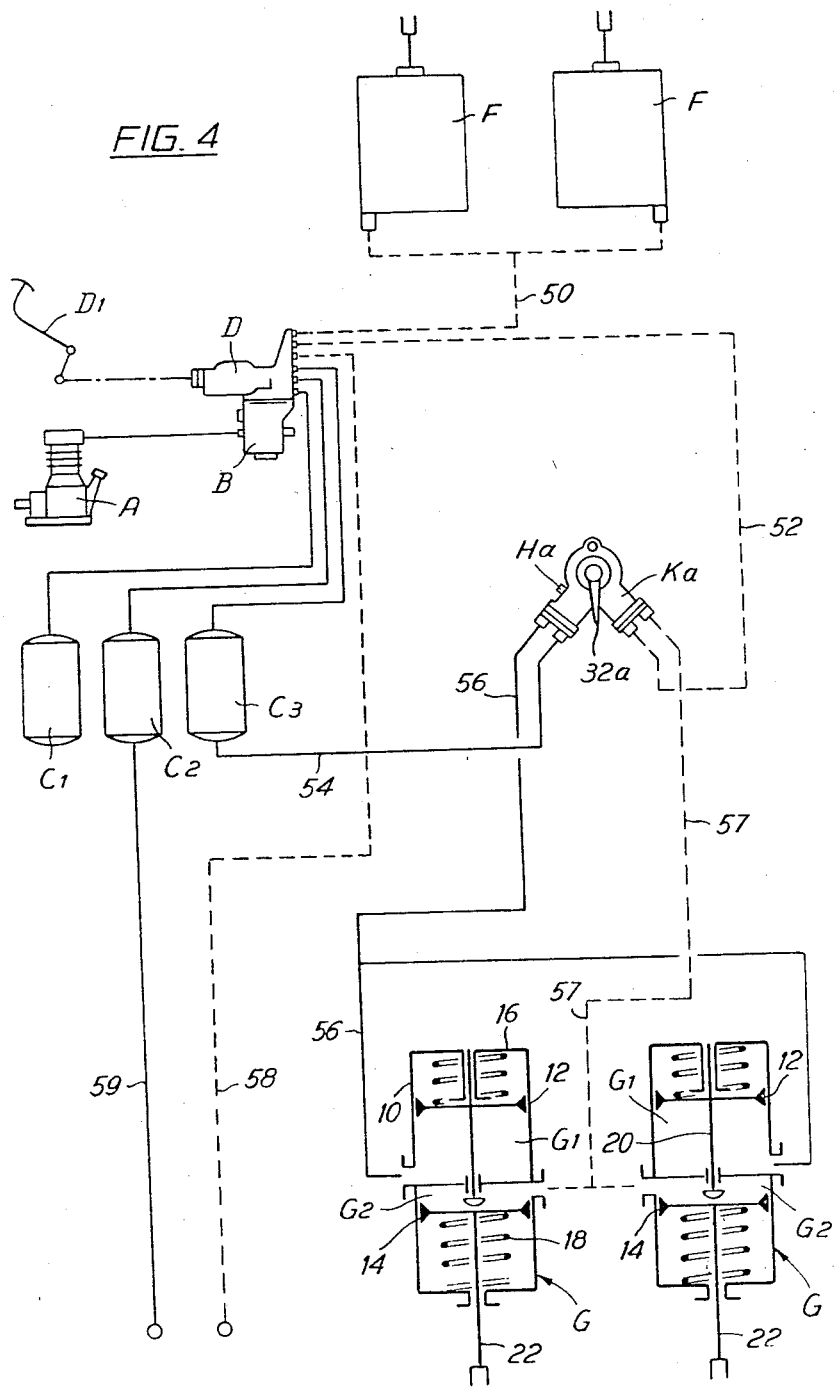
FIGURE 4 is another scheme analogous to the one of FIG. 1 wherein both valve devices are manually operated.
Figure 5:
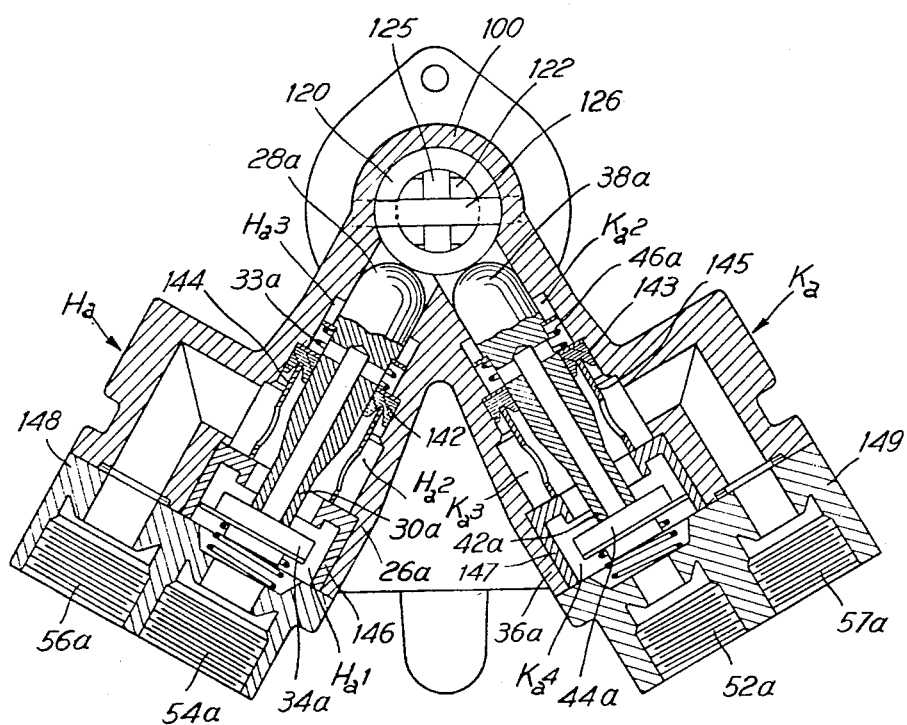
Figure 6:
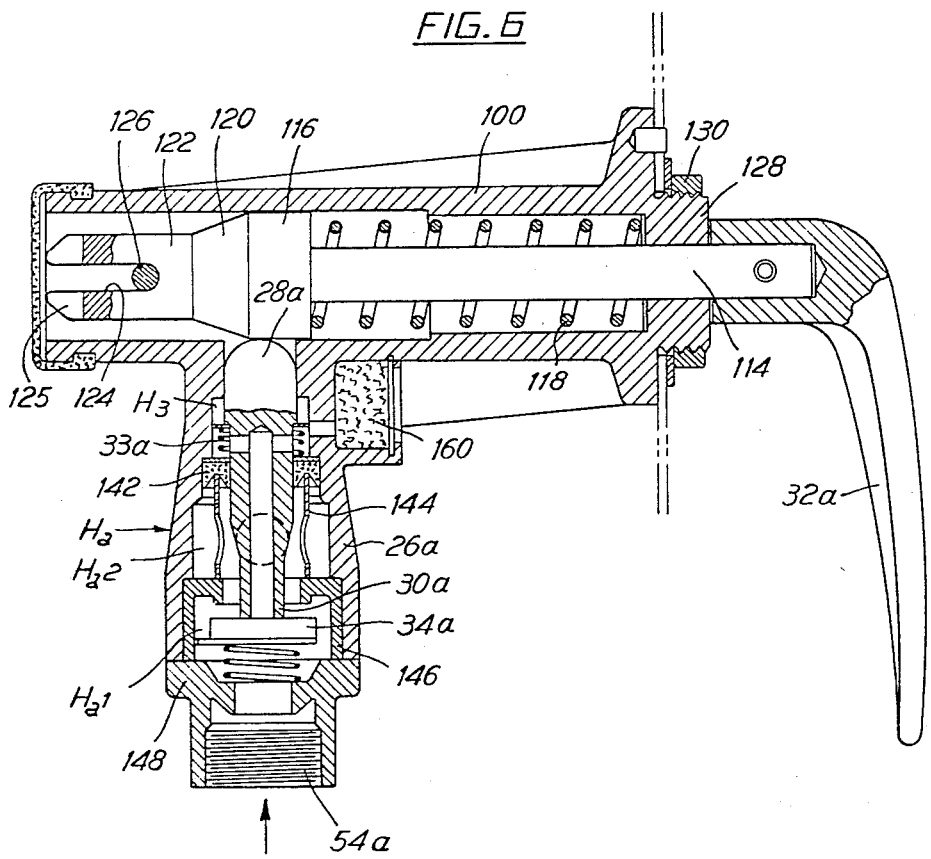
FIGURES 6 and 7 are the axial sections with the control members in two different positions.
Figure 7:
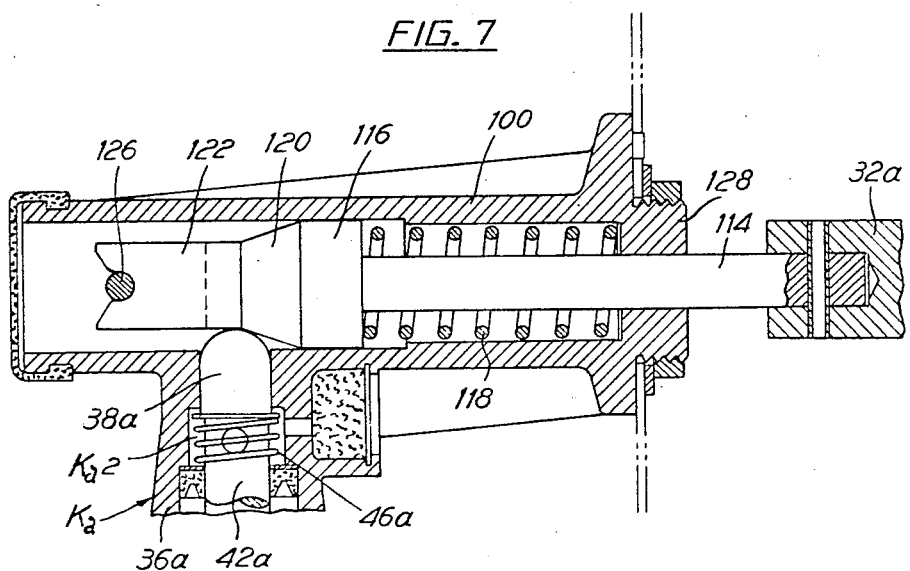

When considering the pneumatic system illustrated in FIG. 4—where the same parts are marked with the same reference marks—both valve devices H and K are so realized as to form a group where the movable portions of said devices are operated by a single manual control member. Said group is illustrated by FIGURES 5 to 7 and is constituted of a body 100 housing a member for actuating two groups of commutable valves. This member involves a handle 32a unitary with a rod 114 slidable in the body 100 and ending at its other extremity with a cylindrical head 116 biased by the action of a helical spring 118 inserted in said rod.

Head 116 shows a truncated cone-shaped section 120 ending with a small pin 122 provided at its ends with two diametral slits 124 (of greater depth) and 125 (of reduced depth).

Said slits are so sized as to house, alternatively, a peg 126 fastened to the parts of the body 100 so that the head 116 will be positioned in one of two positions normal to each other, depending on the maneuver made by the driver on the handle 32a.

Central body 100 is provided, in correspondence with the handle 32a, with a threaded hub 128 with respective nut 130 tightening the device to the considered part; said body shows towards its other end two like cylinders 26a and 36a housing the members of two commutable valves and relating to the valve devices Ha and Ka.

Precisely in said cylinders the respective pistons 28a and 38a are slidably housed, ending on one side with bored push rods 30a and 42a and on the other side with convex heads co-operating with the conical head 120.

The engagement between said parts is secured by the action of springs 33a and 46a acting on said push rods and which are held, through gaskets 142, 143, by bored sleeves 144, 145, which are supported by bushings 146 and 147 inserted in the respective cylinders 26a and 36a and there held by the bottom dishes 148 and 149 clamped by screws to the ends of said cylinders.

Bushings 146, 147 show towards their upper end the holding seats for spring valves 34a, 44a pressed by respective springs and adopted to be engaged by the ends of the push rods 30a and 42a.

The holes of said push rods communicate, through radial holes, with the chambers Ha3 and Ka2 connected with the atmosphere. Said chambers communicate with other chambers Ha2 and Ka3 which in turn communicate through the interception valves 34a and 44a with pressure chambers Ha1 and Ka4. Said chambers are connected with the further parts of the system in the way already considered for the FIG. 1.

Operation of the just described system is equal to the one already considered in the case of FIG. 1; precisely under the normal operation conditions the group of valve devices Ha and Ka assumes the position illustrated in FIGURES 5 and 6, wherein the peg 126 is engaged in the slit 124 so that the head 116 engages the push rods 30a and 42a against the respective interception valves 34a and 44a to establish thus the direct connection between the chambers Ha1–Ha2 and Ka3–Ka4.

Accordingly the pressure of tank $C_3$ is transmitted to the chambers $G_1$ of the mechanical motors to neutralize the action of springs 16a.

When operating the distributor D the brakes are actuated in the conventional way through the operating elements F and G.

In order to perform emergency or stationary braking, the handle 32a is shifted axially with the head 116 disengaging the slit 124 from the peg 126; subsequently said handle is rotated 90° to engage the lit 75 with said peg 126. In this position the push rod 30a and 42a are disengaged from the interception valves 34a and 44a by the action of the respective springs: this is allowed owing to the presence in correspondence with the ends of their pistons 28a and 38a of the small pin 122. This results in connecting the chambers Ha2 and Ka3 with the atmosphere, while connecting accordingly with the atmosphere also the chambers $G_1$ of the mechanical motors and $G_2'$ of the pneumatic motors relating to the operating members G'; the spring 16a therefore actuate and lock the brakes.

Of course owing to the arrangement of the slits 124 and 125 and of the peg 122 it is possible to hold steadily the interception valves 34a and 44a in the open or closed positions; in this latter case the stationary braking of the vehicle is performed. Moreover and as already mentioned it is possible in this case too to perform the modulated emergency braking by displacing axially with the proper rule the conical head 116 actuating the push rods 30 and 42.

Figure 8:
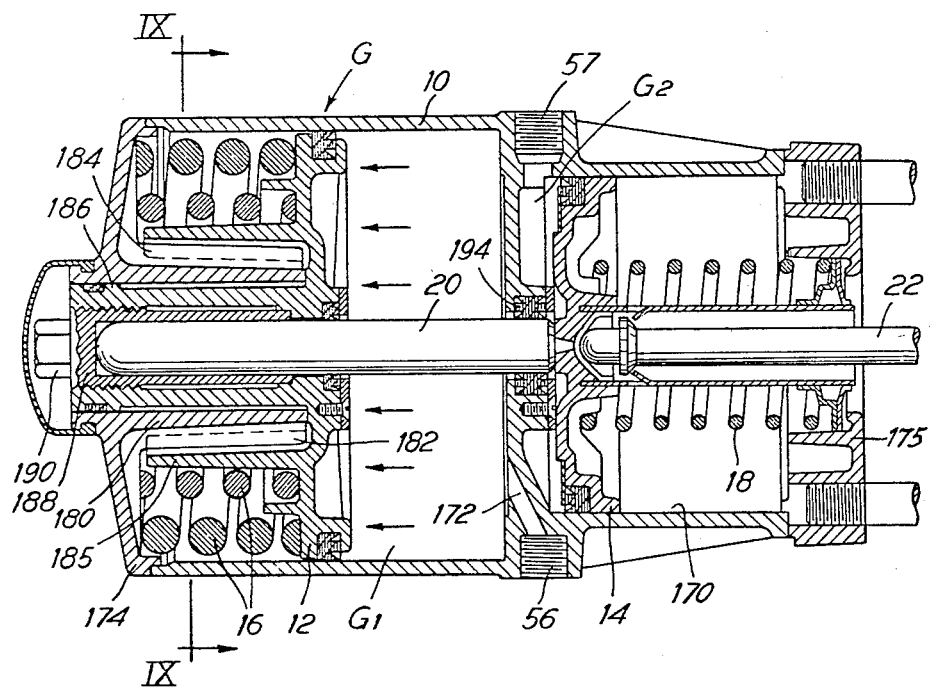
FIGURE 8 is an axial section of one of the operating members of the brakes, of the mechanical-pneumatic type, mounted on the tractor of the system according to FIGURES 1, 2 and 6.
Figure 9:
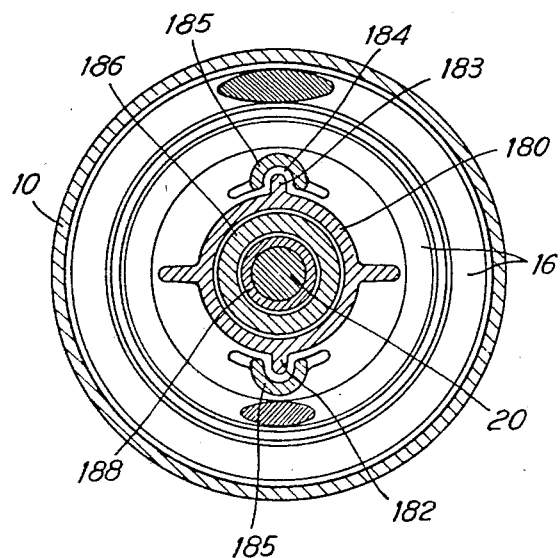
FIGURE 9 is a section made along the line IX—IX of FIG. 8.

When considering now the FIGURES 8 and 9, these illustrate an improved operating mechanical-pneumatic member G, which may be used in the systems of FIGURES 1, 2 and 6, 7.

In the considered element a housing is foreseen which forms two coaxial cylinders 10 and 170 of different diameters, each other separated from the other by a mutual bottom 172 and closed by lids 174, 175.

In cylinders 10 and 170 the respective pistons 12 and 14 slide, the first biased by a plurality of helical springs 16, whose action is in contrast with the pressure acting on the other face of said piston 12. Springs 16 are held by the lid 174, which in its central part shows a sleeve 180 projecting towards inside, and which is provided along one or more of its generating lines with longitudinal fins 182 (see FIG. 9) each one of which is engaged in a respective groove 184 obtained longitudinally in a rib occurring in the body of the piston 12, so that this latter is hindered in rotating during its axial displacements.

In the hole of the sleeve 180 a bushing 186 slides in guides and is unitary with the body of the piston 12 to constitute the stem of this latter. In correspondence with its free end the bushing 186 is threaded to hold a socket 188 provided with maneuver head 190. The socket 188 holds the end of a push rod 20 which by means of suitable packings 194 crosses the mutual bottom 172 to engage with its other end with the piston 14, to connect axially this latter with the stem 22 of the piston 14.

A spring 18 held by the lid 175 exerts on the piston 14 an opposite action lesser than the one exerted by the springs 16 on the piston 12.

Extreme chambers of both cylinder-piston groups 10–12 and 170–14 are permanently connected with the atmosphere, whereas the intermediate chambers $G_1$ and $G_2$ join, through respective unions, with the lines 56 and 57, respectively, of the systems of FIGURES 1, 2 and 6.

In order to neutralize the action of springs 16 locking steadily the vehicle brakes, the operative connection among the pairs of pistons 12–14 and the brakes must be discontinued when said brakes are to be loosened. This operation, in the case of the operating member G above illustrated and now considered, may be readily accomplished by means of a suitable wrench engaged with the head 190 to unscrew the tubular socket 188 of the bushing 186. Thus the piston 12 is separated from the stem 20; this latter may be allowed to retrocede from the right toward left (FIG. 8), together with the stem 22. This operation is promoted by the intervention of spring 18.

When the operating members G occur in said position loosening the brakes, and when considering always the previously described pneumatic systems, the braking system may be partially utilized in order to perform the only moderable braking. In fact it will suffice to bring back the handle 32 of the valve device H to the initial position while excluding however, by means of suitable members, the actuation of the first valve device K so as to establish the communication only between the chambers $K_3$–$K_4$, while intercepting instead the communication between the chambers $H_1$–$H_2$ of the second valve device H.

Disactuation of springs 16 could be achieved also by means of distant controls while considering the location of the operating members G on the vehicle.

Modifications and variations may be applied to the system according to the invention while considering the characteristics of the normal braking system and the purposes which are to be attained.

The manual emergency braking could be performed also by means of suitably fed electrovalves. Moreover the connection between the chambers $G_2$ and $S_2$ of the operating members G and S either with the compressed air source or with the atmosphere could be performed with commutable valves actuated by other members of the valve device H. These and other alternatives may be made without departing from the scope of the present invention.

I claim:

1. A system for the pneumatic braking of vehicles, particularly for the normal, emergency and stationary braking of a tractor, comprising an air compressor, at least one compressed air tank operatively connected to said air compressor and constituting a source of pressure, a pedal-actuated distributor means operatively connected to said air tank and said brake for controlling the actuation of the latter, at least one braking system of the tractor including automatic and variable braking lines, members of the mechanical-pneumatic type comprising two servomotors, one being a pneumatic motor provided with a chamber fed by one of the pressure sources through said distributor to perform normal braking, and the other being a mechanical motor provided with a chamber kept normally under pressure by one of said pressure sources and which is connected with the atmosphere to perform emergency braking, first and second valve devices, the first of which controls the normal braking and the second of which controls the emergency and stationary braking, each of said valve devices including interception valve means actuated simultaneously with the actuation of said valve devices so that when said interception valves are in their open position the system is conditioned for normal braking, said first valve device being actuated to place the distributor in communication with the chamber of the pneumatic motor, said second valve device being actuated to place said pressure source in communication with the pneumatic chamber of the mechanical motor, whereas when said interception valves are in a closed position to perform emergency and stationary braking the first valve device intercepts communication from the distributor and puts the chamber of the pneumatic motor in communication with the atmosphere and the second valve device intercepts the communication from the emergency pressure source and connects the pressure chamber of the mechanical motor with the atmosphere.

2. A system according to claim 1 in which the second valve device for the emergency and stationary braking is provided with manually actuated controlling members.

3. A system according to claim 1 wherein both valve devices are combined to form a single manually operated controlling member.

4. A system according to claim 3 in which said valve devices comprise a cylinder member, piston means slidably mounted in said cylinder, a bored rod fixedly mounted on said piston, said interception valve being mounted in an end portion of said cylinder and being actuated by said bored rod, said piston means and said interception valve dividing said cylinder into several chambers which are selectively connected between atmosphere and with said automatic and variable braking lines, operating means for controlling both said valve devices so as to selectively connect simultaneously the chambers of both brake actuating motors with atmosphere and with the respective compressed air sources.

5. A system according to claim 4 further comprising a housing having therein a manual operating member, a stem fixedly connected to said operating member, a truncated cone shaped head mounted on said stem, spring bias means acting on said head, means for at least axially positioning said head with respect to the spring bias means acting thereon; first and second bored push rods, spring bias means acting on each said push rod, said push rods operatively co-operating with their bored ends with said interception valves controlling the communication between the chambers of the braking operating members selectively with the compressed air source and with the atmosphere.

6. A system according to claim 5 wherein the truncated cone shaped head has at its free end a small pin provided with two diametral slits of different depth, a head fixedly held by the housing, said head being slidably mounted to alternatively engage with said pin in order to position said head axially.

7. A system according to claim 1 wherein both valve devices constitute two distinct and separated unities, the first valve device for normal braking being pneumatically servo-controlled by the second valve device for emergency and stationary braking.

8. A system according to claim 7, in which the first valve device for normal braking includes means sensitive to the pressure of one of the pressure sources, through the second valve device controlling the emergency and stationary braking, said pressure sensitive means actuating the interception valve of said first valve device so that when emergency braking is performed, by means of the manual operation of the second valve device, the pneumatic chambers of the pneumatic motors are connected with the atmosphere and simultaneously the chambers of the mechanical motors are connected with the atmosphere through said second valve device.

9. A system according to claim 7 in which the means sensitive to the pressure of the first valve device controlling normal braking comprise a cylinder, double piston means slidable within said cylinder, a bored stem having said double piston means fixedly mounted thereon, one end of said bored stem engaging with the interception valve, spring bias means acting on at least one of said pistons, said one piston being normally subjected to the pressure of the source associated to the second valve device against the action of said spring bias means, the other of said pistons constituting, during the normal braking, an interception wall between a feeding chamber and a discharge chamber of said cylinder so that when the pressure acting on the first piston attains a given value the valve is opened placing the pneumatic chambers for normal braking in communication with the feeding source through the distributor, and when said pressure is below said value said valve is brought back to the closed position to intercept communication with the distributor and allow communication with atmosphere of the pneumatic chambers of the operating members of the brakes through the bored stem and the discharge chamber.

10. A system according to claim 7 in which the second valve device for the emergency and stationary braking comprises a piston, a bored push rod having said piston mounted thereon and being adopted to engage the interception valve against the action of the spring means, said piston being manually operated.

11. A system according to claim 1, for the pneumatic braking of a tractor and at least one trailer provided with pneumatic brakes and a servoautodistributor and wherein at least one of the braking sections of said trailer has brake operating members of the bipneumatic kind, namely at least two elementary pneumatic motors, one for the normal braking through the servoautodistributor and the other for the emergency braking, comprising a third valve device for the trailer emergency braking, said third valve device being mounted on the tractor and pneumatically connected with the second valve device, said third valve device comprising means sensitive to the pressure of the emergency pressure source of the tractor and, through the second valve device to actuate interception valves inserted in the line, for the trailer emergency braking, so that when said tractor emergency braking is performed, by means of the manual control of the second valve device, pneumatic aid chambers of the bipneumatic operating members of the trailer brakes are directly fed from a second emergency source of the trailer.

12. A system according to claim 11 in which the pressure sensitive means of the third valve device comprise a cylinder, two pistons slidable in said cylinder, a bored stem having said pistons mounted thereon and adopted to engage with the interception valve controlling communication between the other emergency source and the operating bipneumatic members of the brakes, spring bias means biasing one of said pistons, said one piston being normally subjected to the action of the source pressure for the tractor emergency braking against the action said spring bias means, the other piston constituting a separation wall between a chamber linked with the bipneumatic operating members and a discharge chamber, so that when the pressure of the first emergency source acting on the first piston reaches a given value the interception valve closes communication between the second emergency source and the aid pneumatic chambers of the bipneumatic operating members of the trailer, which chambers are put in communication with the atmosphere, through the bored stem and the discharge chambers, whereas when said pressure is below the given value the interception valve is opened to establish the communication between said emergency source and said pneumatic aid chambers.

13. A system according to claim 1 wherein said operating members of the brakes are partially of the mechanical-pneumatic kind, said operating members including dismountable connection means interposed between the spring piston of the mechanical motor and the respective stem to nullify the action of the spring means acting on said piston.

14. A system according to claim 13, in which the piston of the mechanical motor is linked with the respective stem through threaded members whose loosening and disengaging nullifies the action of said spring means and discontinues the mechanical linkage between the stem and the piston.

References Cited

UNITED STATES PATENTS

| | | | |
|---|---|---|---|
| 3,228,730 | 1/1966 | Schubert | 303—7 |
| 3,241,888 | 3/1966 | Ternent | 303—7 |

FERGUS S. MIDDLETON, *Primary Examiner.*

JOHN J. McLAUGHLIN, *Assistant Examiner.*